United States Patent
Nadovich et al.

(10) Patent No.: US 10,061,080 B2
(45) Date of Patent: Aug. 28, 2018

(54) MULTI-MODE FORKED GRATING COUPLER

(71) Applicants: Christopher T. Nadovich, Easton, PA (US); William D. Jemison, Potsdam, NY (US)

(72) Inventors: Christopher T. Nadovich, Easton, PA (US); William D. Jemison, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 15/793,602

(22) Filed: Oct. 25, 2017

(65) Prior Publication Data
US 2018/0143375 A1 May 24, 2018

Related U.S. Application Data

(60) Provisional application No. 62/412,785, filed on Oct. 25, 2016.

(51) Int. Cl.
| | | |
|---|---|---|
| *G02B 6/124* | (2006.01) | |
| *G02B 6/122* | (2006.01) | |
| *G02B 6/30* | (2006.01) | |
| *G02B 6/12* | (2006.01) | |

(52) U.S. Cl.
CPC .......... *G02B 6/124* (2013.01); *G02B 6/1228* (2013.01); *G02B 6/305* (2013.01); *G02B 2006/1209* (2013.01); *G02B 2006/12147* (2013.01)

(58) Field of Classification Search
CPC ...... G02B 6/124; G02B 6/305; G02B 6/1228; G02B 2006/12147; G02B 2006/1209; G02B 2006/12107; G02B 6/29316; G02B 6/34; G02B 6/3534
See application file for complete search history.

(56) References Cited

U.S. PATENT DOCUMENTS

| | | | | |
|---|---|---|---|---|
| 8,494,315 | B2 * | 7/2013 | Dupuis | B29D 11/00663 385/14 |
| 9,162,404 | B2 * | 10/2015 | Doerr | B29D 11/00663 |
| 9,453,969 | B2 * | 9/2016 | Kobyakov | G02B 6/305 |
| 9,548,589 | B2 * | 1/2017 | Chen | H01S 5/2054 |
| 9,753,219 | B2 * | 9/2017 | Nadovich | G02B 6/124 |

* cited by examiner

*Primary Examiner* — John M Bedtelyon
(74) *Attorney, Agent, or Firm* — Bond Schoeneck & King, PLLC; Blaine Bettinger; George McGuire

(57) ABSTRACT

A device and system for coupling optical vortex multiplexed light into and out of a photonic integrated circuit. The multi-mode forked grating coupler device comprises: (i) a multi-mode forked grating structure configured to receive at least one optical vortex multiplexed light beam, wherein the multi-mode forked grating structure comprises at least one forked region positioned amidst a plurality of grooves, wherein the forked region comprises a single groove forking into two grooves, wherein the single groove is noncontiguous with the two grooves, and wherein the plurality of grooves comprise a central bending region; (ii) an optical waveguide; and (iii) a tapered portion connecting the forked grating structure and the multi-mode optical "bus" waveguide.

20 Claims, 7 Drawing Sheets

MULTI-MODE FORKED GRATING COUPLER

CROSS-REFERENCE TO RELATED APPLICATIONS

This application claims priority to U.S. Provisional Patent Application Ser. No. 62/412,785, filed on Oct. 25, 2016, the entire disclosure of which is incorporated herein by reference.

FIELD OF THE INVENTION

The present disclosure is directed generally to an optical device and system for coupling light into and out of photonic integrated circuits.

BACKGROUND

Wavefronts can contain dislocation lines, closely analogous to those found in imperfect crystals. Surrounding these dislocations, the wave field can have interesting properties. For example, optical vortex ("OV") beams contain a wavefront phase singularity in their center. Such beams can propagate in free space or in special kinds of optical fiber waveguide. OV beams have a variety of potential applications in many areas, including particle manipulation, micro fabrication, and optical communications. OV beams are characterized by helical phase fronts, a null central intensity, and the ability to convey internal optical orbital angular momentum (OAM).

An important characteristic of these beams is an azimuthal phase dependence $e^{ix\varphi}$ where $\varphi$ is the azimuthal angle about the beam, and x represents the overall topological charge of the internal Orbital Angular Momentum (OAM) of the beam. As a consequence of this helical phase, the phase front has a screw dislocation in the center of the beam. E fields cancel at this point giving rise to so called "donut modes" with zero intensity centers and singular phase.

One of the specific advantages possessed by OV beams for use in communications is that they can be described as the superposition of infinite set of mutually orthogonal propagating modes that are independent of polarization and wavelength. As these orthogonal OAM modes are parameterized by the distinct integer "topological charge" that can vary without theoretical limit, exploiting OAM can multiply the number of available channels in optical communications multiplexing above and beyond what is available with wavelength and polarization multiplexing.

Technology for connecting external photonic signals, free space or fiber-guided light beams, to a Photonic IC (PIC) is not quite as straightforward as connecting external electronic signals carried by copper PCB traces to ordinary electronic ICs. Existing fiber-to-PIC interface options include lens focusing, end-butt fiber coupling, prism couplers, tapered couplers, and grating ("Bragg") couplers. Bragg couplers couple light near vertically in and out of the optical slab or film waveguides of integrated optics. The near vertical coupling of a grating coupler provides physical flexibility in placing the optical interface anywhere on the chip surface. As such, a grating coupler represents an analogous optical bond pad on the PIC where a fiber conveniently could be butt-coupled, or a free-space beam could be focused. This allows increasing the density of optical interfaces and preserves the chip edge to be used for low- and high-speed electronic signal pads.

However, there remains a continued need in the art for more efficient and adaptable devices and systems for coupling light into and out of photonic integrated circuits. Furthermore, there is a continued need for multiplexing coupler devices.

SUMMARY OF THE INVENTION

The present disclosure describes a device and system for coupling light into and out of a photonic integrated circuit. According to an embodiment, the multi-mode forked grating coupler device applies a multi-mode forked grating structure to the design of the diffracting lines in an integrated optics grating coupler to make the device compatible with vortex light beams to or from free space, bulk optics, or special optical fiber that can propagate vortex modes. These diffracting lines, which can be grooves, or ridges, or a photonic metamaterial discontinuity arranged in a continuous or intermittent curve, follow the forked diffraction pattern lobes over a two-dimensional surface.

According to one aspect is a multi-mode forked grating coupler device comprising: (i) a multi-mode forked grating structure configured to receive at least one optical vortex light beam, wherein the multi-mode forked grating structure comprises at least one forked region positioned amidst a plurality of grooves, wherein the forked region comprises a single groove forking into two grooves, wherein the single groove is noncontiguous with the two grooves, and wherein the plurality of grooves comprise a central bending region; (ii) an optical waveguide; and (iii) a tapered portion connecting the multi-mode forked grating structure and the optical waveguide.

According to an embodiment, a first subset of the plurality of grooves comprise a first thickness, and a second subset of the plurality of grooves comprise a second thickness, wherein the first and second thicknesses are different.

According to an embodiment, at least some of the plurality of grooves are segmented.

According to an embodiment, each of the plurality of grooves comprises a first straight section and a second straight section, the first and second straight sections separated by a middle bending region, and wherein the first and second straight sections are parallel.

According to an embodiment, the at least one forked region is positioned in the center of the multi-mode forked grating structure.

According to an embodiment, the optical vortex light beam is received from an optic.

According to an embodiment, the optical vortex light beam is received from an optical fiber.

According to an embodiment, the coupler comprises at least two optical waveguides and at least two tapered portions.

According to an aspect is an optical coupling system comprising: an optical coupler comprising: (i) a multi-mode forked grating structure configured to receive at least one optical vortex light beam, wherein the multi-mode forked grating structure comprises at least one forked region positioned amidst a plurality of grooves, wherein the forked region comprises a single groove forking into two grooves, wherein the single groove is noncontiguous with the two grooves, and wherein the plurality of grooves comprise a central bending region; (ii) an optical waveguide; and (iii) a tapered portion connecting the multi-mode forked grating structure and the optical waveguide; and a photonic integrated circuit configured to receive light from the optical coupler.

According to an embodiment, each of the plurality of grooves comprises a first straight section and a second straight section, the first and second straight sections separated by a middle bending region, and wherein the first and second straight sections are parallel.

According to an embodiment, the at least one forked region is positioned in the center of the multi-mode forked grating structure.

According to an embodiment, the coupler comprises at least two optical waveguides and at least two tapered portions.

According to an aspect is an optical coupler comprising: (i) a multi-mode forked grating structure configured to receive at least one optical vortex light beam, wherein the multi-mode forked grating structure comprises at least one forked region positioned amidst a plurality of grooves, wherein the forked region comprises a single groove forking into two grooves, wherein the single groove is noncontiguous with the two grooves, and wherein the plurality of grooves comprise a central bending region; (ii) an optical waveguide; and (iii) a tapered portion connecting the multi-mode forked grating structure and the optical waveguide; wherein each of the plurality of grooves comprises a first straight section and a second straight section, the first and second straight sections separated by a middle bending region, and wherein the first and second straight sections are parallel; wherein a first subset of the plurality of grooves comprise a first thickness, and a second subset of the plurality of grooves comprise a second thickness, wherein the first and second thicknesses are different.

According to an embodiment, at least some of the plurality of grooves are segmented.

According to an embodiment, the at least one forked region is positioned in the center of the multi-mode forked grating structure.

According to an embodiment, the optical vortex light beam is received from an optic.

According to an embodiment, the optical vortex light beam is received from an optical fiber.

According to an embodiment, the coupler comprises at least two optical waveguides and at least two tapered portions.

These and other aspects of the invention will be apparent from the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

The present disclosure describes a device and system for coupling light into and out of a photonic integrated circuit. According to an embodiment, the multi-mode forked grating coupler device applies a modified forked grating structure to the design of the diffracting lines in an integrated optics grating coupler to make the device compatible with vortex light beams to or from free space, bulk optics, or special optical fiber that can propagate vortex modes. According to an embodiment, the multi-mode forked grating coupler device is configured to couple two different optical vortex orbital angular momentum (OAM) charges to or from the transverse electric (TE) rectangular waveguide modes TE0 and TE1 of a photonic "bus" on a photonic integrated circuit (PIC). The multi-mode forked grating coupler thereby facilitates optical fiber multiplexing by allowing OAM multiplexed light beam comprising multiple channels multiplexed with a specific set of different OAM charges to enter a photonic integrated circuit with the multiplexing channels remaining distinct on a multi-mode "bus" waveguide so as to permit multi-channel processing to occur efficiently and compactly on the PIC circuitry.

Figure 1:
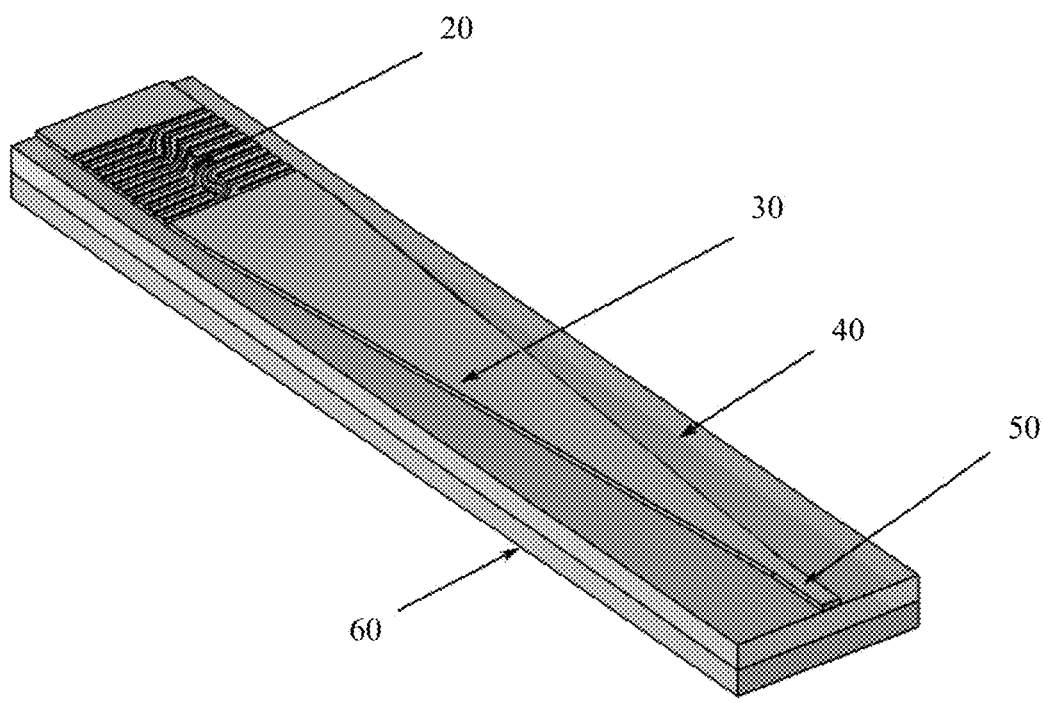
FIG. 1 is a schematic representation of a multi-mode forked grating coupler device, in accordance with an embodiment.

Referring now to the drawings, wherein like reference numerals refer to like parts throughout, there is seen in FIG. 1, in one embodiment, a forked grating coupler device 10. The forked grating coupler device includes a forked holographic grating structure 20. The device also includes a feed taper 30 and feed waveguide 50. According to an embodiment, the structure can comprise a substrate material 40 and a carrier 60. According to an embodiment, the feed waveguide 50 is widened into a multi-mode bus that can support multiple waveguide modes.

The multi-mode forked grating coupler can be utilized with the feed waveguide 50, feed taper 30, and the main portion of the forked grating 20 acting in a slab waveguide mode with optimized thickness of high dielectric material such as silicon over a wider substrate 40 of lower dielectric material such as silicon dioxide, above a carrier material 60 that could be, for example, a silicon wafer. For example, according to one embodiment the waveguide 50, feed taper 30, and forked grating 20 could be composed of approximately 220 nm, the substrate material could be silicon of approximately 1-2 μm, although many other thicknesses are possible, and the carrier material 60 could be a silicon wafer, although other materials are possible. For example, a top device layer of silicon can be etched away around the perimeter of the device, leaving the buried oxide ($SiO_2$) exposed as an outline. This outlining etch defines the input/output photonic "bus" waveguide, such as a 980×220 nm waveguide that supports two IL modes, among many other sizes, that tapers up through an adiabatic structure approximately 500 μm long to a 12 μm wide slab waveguide. On the wide slab the grating could be etched. Once again, a variety of different sizes and materials are possible.

Figure 2:
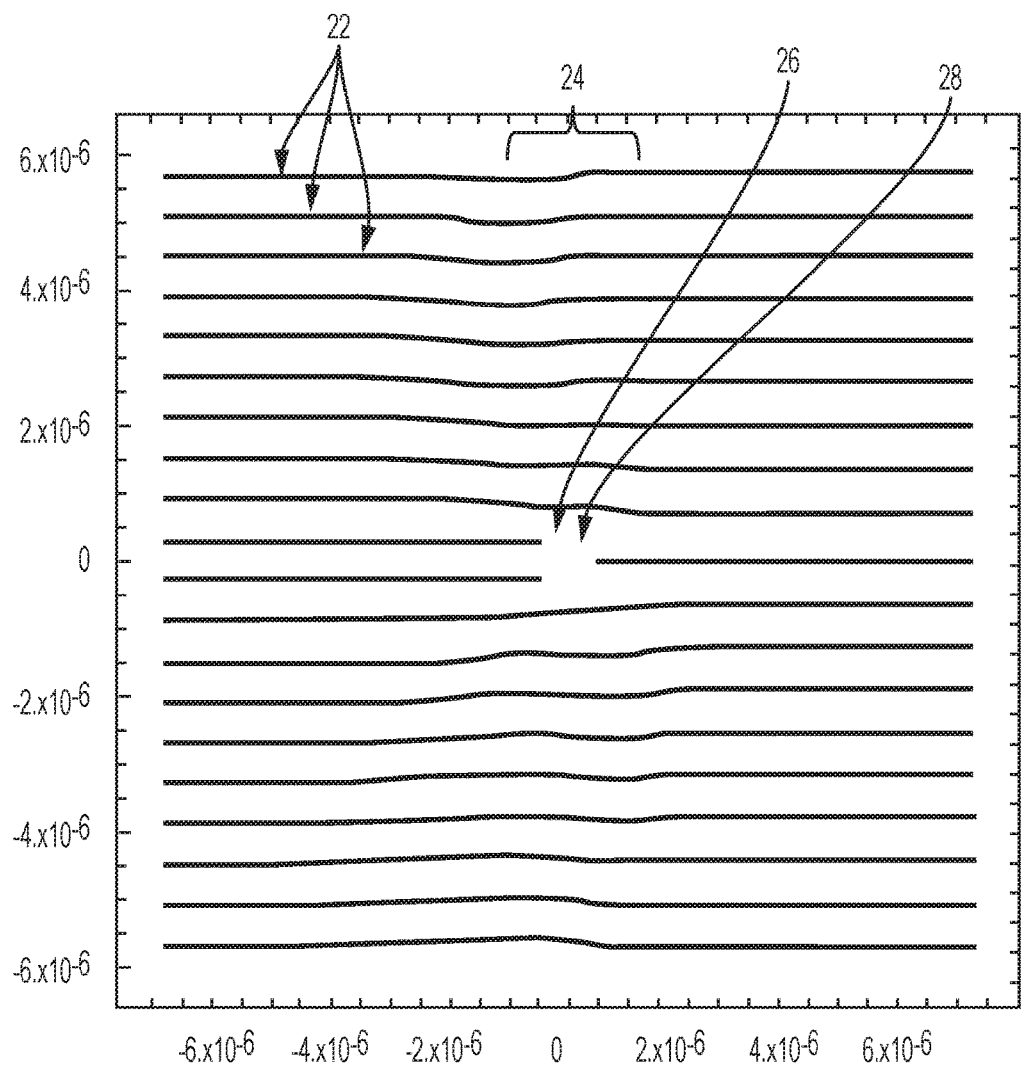
FIG. 2 is a schematic representation of a multi-mode forked grating structure, in accordance with an embodiment.

Referring to FIG. 2, in one embodiment, is an example multi-mode holographic grating structure 20 with a plurality of grooves 22 with each with a midline bend region 24, and a forked region 26 with a fork gap 28. The multi-mode holographic grating structure comprises a dual-mode focused, Hamming apodized hologram that simultaneously couples vortex light with charges +1 and +2 to waveguide modes TE0 and TE1 respectively. Each of the plurality of focusing grooves 22 comprises a midline bend region 24 in which the groove bends slightly to optimize multiplexing performance.

Figure 3:
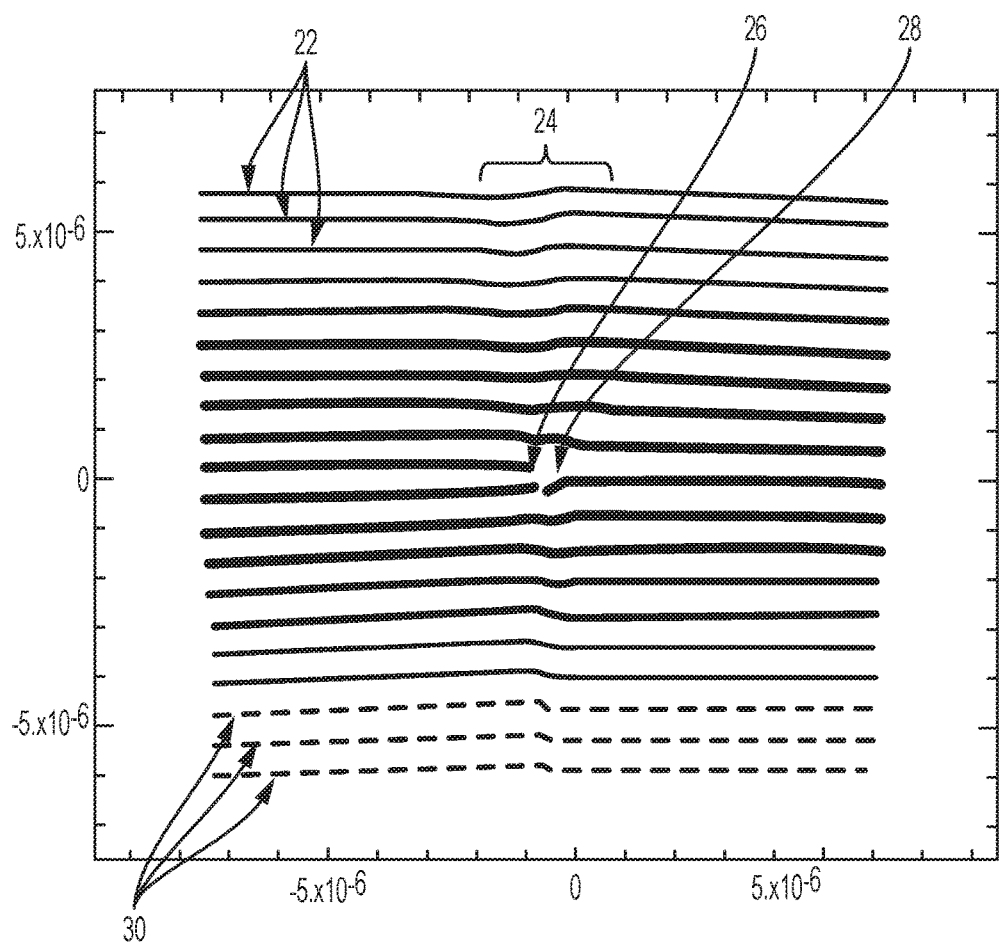
FIG. 3 is a schematic representation of a multi-mode forked grating structure, in accordance with an embodiment.

Referring to FIG. 3, in one embodiment, is an example multi-mode holographic grating structure 20 with a plurality of grooves 22 with each with a midline bend region 24, and a forked region 26 with a fork gap 28. Like the structure in FIG. 2, the multi-mode holographic grating structure 20 in FIG. 3 comprises a dual-mode focused, Hamming apodized hologram that simultaneously couples vortex light with charges +1 and +2 to waveguide modes TE0 and TE1 respectively. Each of the plurality of focusing grooves 22 comprises a midline bend region 24 in which the groove bends slightly to optimize multiplexing performance. Additionally, at least some of the plurality of the focusing grooves 22 are dashed to form dashed focusing grooves 22.

According to an embodiment, the plurality of grooves 22 in FIGS. 2 and 3 comprise a varying groove width. For example, the grooves 22 near the top of the multi-mode holographic grating structure 20 in FIG. 2 are thicker than the grooves near the bottom of the structure. In FIG. 3, the grooves 22 in the middle of the structure are thicker than the grooves on the outside (or upper and lower) portions of the structure. Many other variations are possible.

Figure 4A:
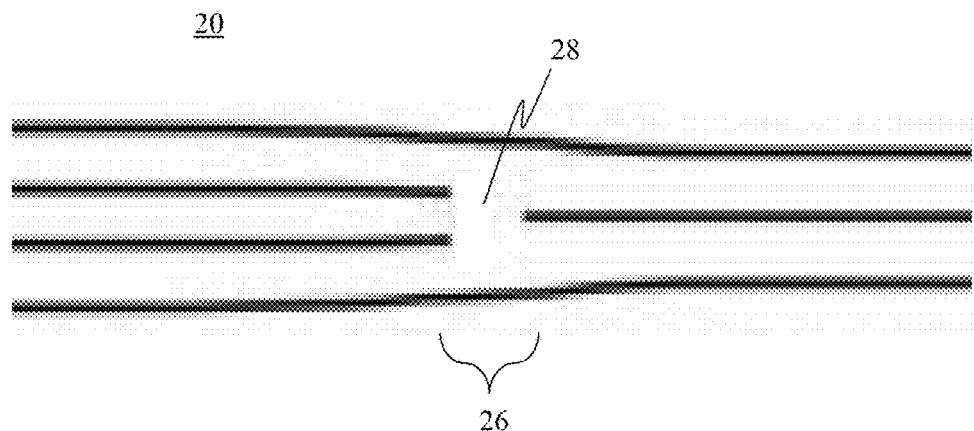
FIG. 4A is a schematic representation of a portion of a multi-mode forked grating structure, in accordance with an embodiment.

The forked region 26 in FIGS. 2 and 3 comprises a single fork in which a single groove 22 forks into two grooves. However, the single groove does not split into two other grooves. Instead the forked region 26 comprises a fork gap 28, or a region of disconnect between the single groove 22 and the two grooves extending from the fork gap. Accordingly, the single groove of the fork gap 28 is noncontiguous with the forking grooves that extend from the fork gap. Referring to FIG. 4A, in one embodiment, is a view of a portion of the multi-mode holographic grating structure 20 showing the forked region 26 with a fork gap 28.

Figure 4B:
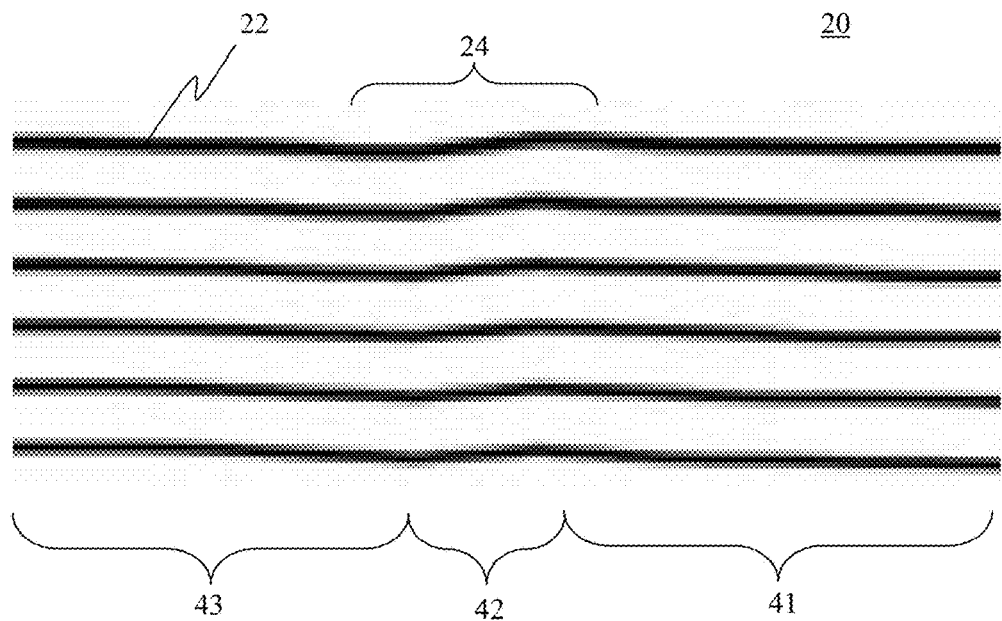
FIG. 4B is a schematic representation of a portion of a multi-mode forked grating structure, in accordance with an embodiment.

Referring to FIG. 4B, in one embodiment, is a view of a portion of the multi-mode holographic grating structure 20 showing grooves 22 with midline bend region 24. In this embodiment, at least some of the grooves extend along a substantially straight line for a first portion 41, then bend toward the center of the structure for a second portion 42, and then bends to extend along a substantially straight line for a third portion 43. According to an embodiment, first portion 41 and third portion 43 are substantially parallel.

Figure 5:
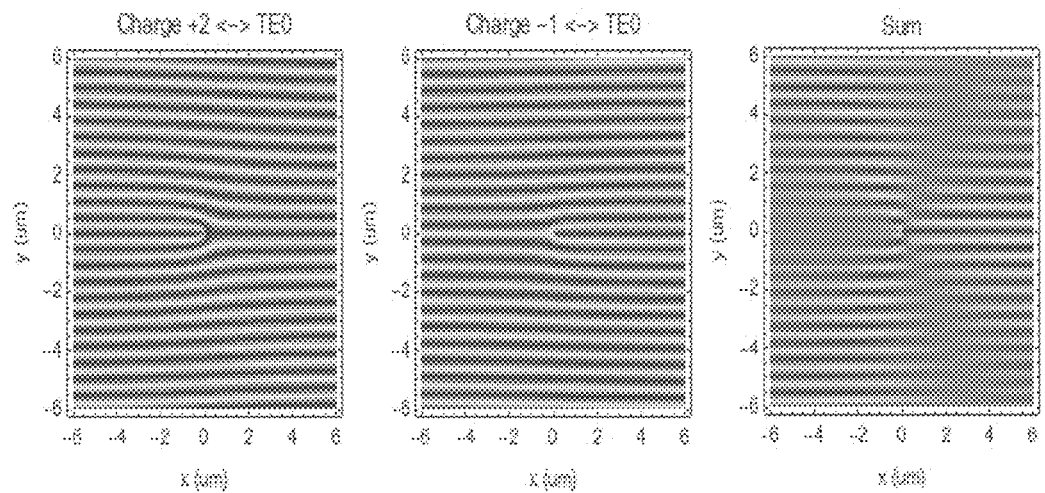
FIG. 5 is a series of schematic representations of interference patterns, in accordance with an embodiment.

According to an embodiment, the design of the multi-mode holographic grating is essential to operation of the multi-mode holographic grating. It is possible to encode multiple spatial modes into a single 2D hologram as the sum of the individual interference patterns between those modes. Referring to FIG. 5 is a schematic representation of the sum of interference patterns linking different vortex-waveguide mode-pairs. The image shows the individual and sum patterns mapping a vortex charge pair +2, −1, to the TE0 mode. With $\Delta\chi=3$, we see three moiré fringes. According to an embodiment, when the interference patterns disagree in the local phases of different encoded modes, their sum will appear as a solid moiré fringe. These fringes represent problematic empty regions that cannot have scattering grooves because the encoded modes have opposite phases there.

In general, for two OAM modes of charge $\chi_1$ and $\chi_2$, interfering with TE0, the number of fringes equals the absolute difference in charges and occur when:

$$\left|\cos\left(\frac{1}{2}\Delta\chi\tan^{-1}\frac{y}{x}\right)\right| < \frac{1}{2} \quad \text{(Eq. 1)}$$

Figure 6:
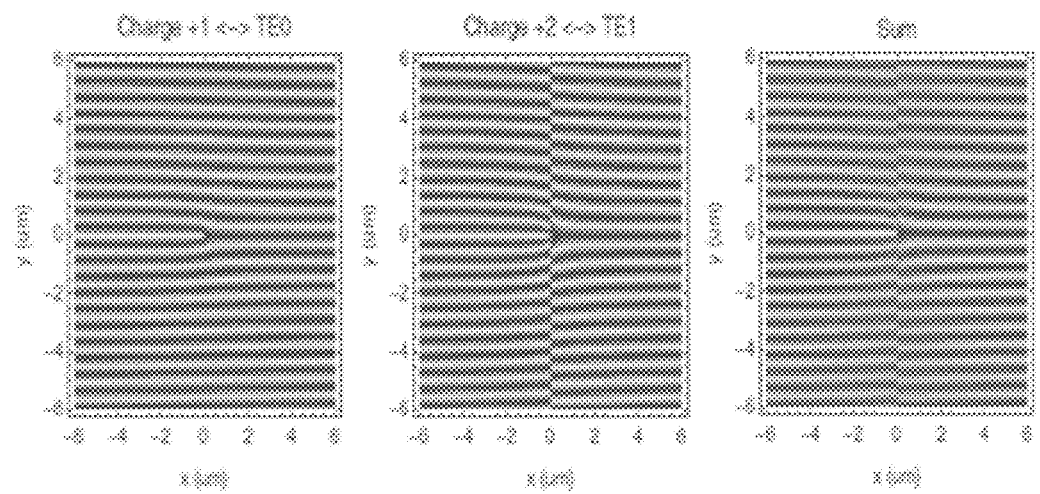
FIG. 6 is a series of schematic representations of interference patterns, in accordance with an embodiment.

This condition also holds for the TE1 mode when x>0. For x<0 the phase inversion in the odd TE1 mode will flip the pattern. Thus, the case of $\Delta\chi=|\chi_1-\chi_2|=1$, that is to say, adjacent charges, when mapping to TE0 and TE1 the single fringe can be "hidden" as shown in FIG. 6. Only one fringe appears with a +/−1 difference between the OAM charges multiplexed. This single fringe can be "hidden" when mapping OAM modes to even and odd waveguide modes.

Consequently, a multi-mode FGC can be constructed where the entire grating area is approximately coherent. Only a phase discontinuity and amplitude "dip" along x=0 (corresponding to portion 24 in FIGS. 2 and 3) remain as inherent distortions to the mode match. This region is smoothed to optimize multiplexing performance. According to an embodiment, the groove widths are modulated to achieve uniform amplitude apodization in the single waveguide propagation direction. The narrow tails are implemented using transverse, sub-wavelength dashing (corresponding to portion 30 in FIG. 3). The grating is also curved as described or otherwise envisioned herein to focus to a shorter, more compact feed length.

According to an embodiment, the multi-mode hologram can be used to couple multi-channel OAM multiplexed incident optical vortex waves into a single multi-mode integrated optics waveguide. As a result, the multi-mode holographic grating structure 20 provides numerous advantages. For example, the structure can be used to couple a selected set of OAM modes into different modes of an optical waveguide. The grating coupler supports OAM multiplexing by means of a single multi-mode "bus" waveguide interface that carries multiple multiplexing channels remaining distinct by being encoded on separate waveguide modes. The structure provides groove width modulation apodization to control the amplitude distribution of multiple OAM modes simultaneously using flat or Hamming window functions to improve mode fidelity. The structure can utilize a sub-wavelength transverse duty cycle dashed grooves to implement low diffraction "tails" of the apodization amplitude distribution. Additionally, the structure can comprise curved focused holographic grating grooves that significantly shorten the length required in the adiabatic feed.

Example—Simulation

According to an embodiment, the multi-mode holographic grating structure 20 of FIG. 3 was modeled modeled using fully vectorial 3D FDTD simulation with 1550 nm light for implementation on SOI wafer with 220 nm device and 2 um BOX layers. Gratings are shallow etched down 70 nm. Groove width apodization flattens amplitude across the grating, improving mode match. The inherent phase discontinuity along the y-axis is somewhat smoothed in this design. Simulation results given in Table 1 show that 20 dB crosstalk isolation is achieved; with about a 3 dB mode mismatch loss—only about 1 dB worse than a single-mode FGC.

According to an embodiment, Table 1 shows calculated crosstalk isolation for the MMFGC design of FIG. 3, taken between the TE0 and TE1 modes and various vortex charges.

TABLE 1

Simulation Results

| | Crosstalk (dB) | |
|---|---|---|
| Charge | TE0 | TE1 |
| −3 | −17.7 | −32.2 |
| −2 | −28.7 | −16.8 |
| −1 | −10.9 | −27.8 |
| 0 | −32.7 | −11.1 |
| 1 | −3.1 | −21.1 |
| 2 | −23.4 | −3.0 |
| 3 | −12.5 | −23.0 |

Figure 7:
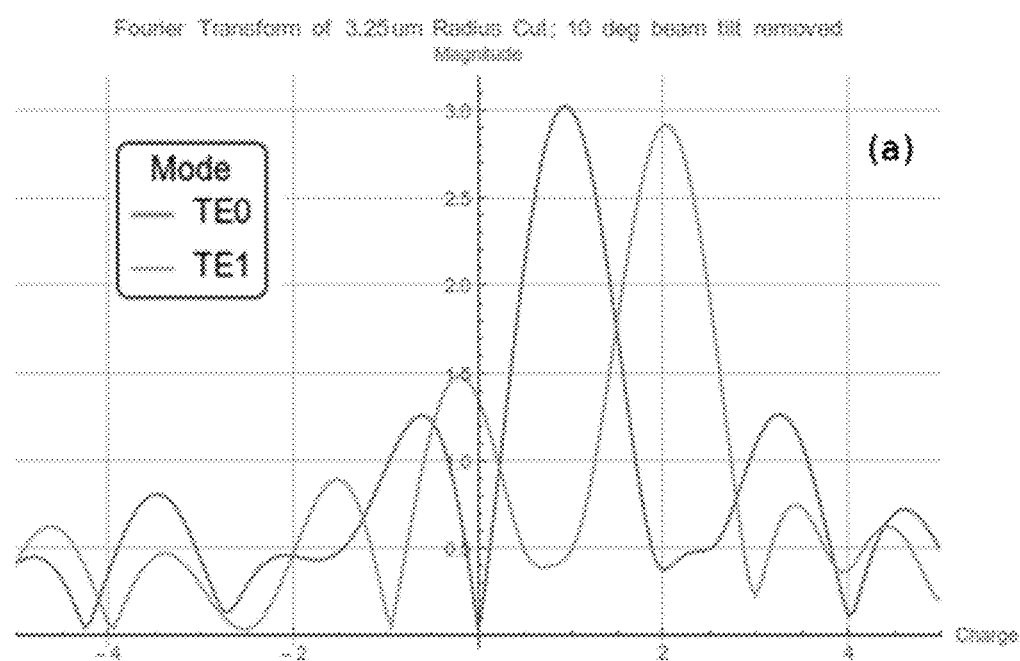
FIG. 7 is a graph of polar Fourier transform through main radius of vortex ring (3.25 um) for waveguide TE0 and TE1 modes of a multi-mode forked grating coupler, in accordance with an embodiment.
Figure 8:
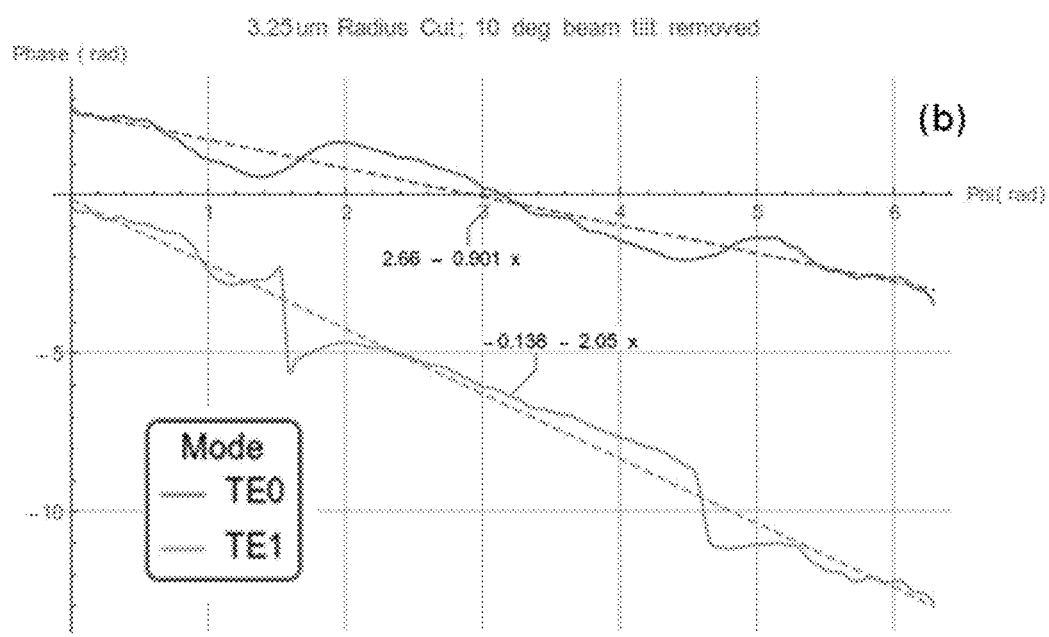
FIG. 8 is a graph of phase cuts through main radius of vortex ring (3.25 um) for waveguide TE0 and TE1 modes of a multi-mode forked grating coupler, in accordance with an embodiment.

According to an embodiment, FIGS. 7 and 8 provide additional details of predicted performance for the multi-mode holographic grating structure 20 of FIG. 3. For example, FIG. 7 is a graph of polar Fourier transform through main radius of vortex ring (3.25 um) for waveguide TE0 and TE1 modes of a multi-mode forked grating coupler, in accordance with an embodiment, and FIG. 8 is a graph of phase cuts through main radius of vortex ring (3.25 um) for waveguide TE0 and modes of a multi-mode forked grating coupler, in accordance with an embodiment. Abscissa of Fourier spectrum is analogous to topological charge. Straight line fits to phase have slope analogous to charge.

A polar Fourier transform is a useful metric for evaluating vortex fidelity with relevance to multiplexing. As is shown, crosstalk is very low for the design charge pair. Also plotted is the phase around the vortex. The average phase slope of the +2 vortex mode is very close to 2.0, while the average phase slope for the +1 vortex is about 10% low.

According to an embodiment, the multi-mode holographic grating structure 20 is compatible with the integrated optics fabrication process, and with the CMOS process. Multi-mode forked grating couplers can be placed freely on a photonic integrated circuit. The forked grating structure is low profile and occupies little area. It can be fabricated with well-established processes used to create conventional grating couplers. Dual polarization splitting techniques applicable to conventional grating couplers remain applicable to the MMFGC.

According to an embodiment, the multi-mode holographic grating structure 20 has advantages specific to its ability to selectively interact with multiple optical vortex modes. For example, the structure interfaces easily with normal or near-normal light from a multiplexed optical vortex-fiber or other OAM source.

Additionally, the multi-mode holographic grating structure 20 is advantageous for its single bus waveguide interface. For example, because there is only one interface, the wave propagation direction is the same for all the modes being multiplexed. This allows the amplitude apodization of the holographic grating to be constructed simply in accordance with this single direction. Second, because multiple multiplexed channels are retained on a single waveguide, multiple channels can be transmitted across the PIC in a very compact and convenient manner, being split apart or combined when needed by means of conventional mode splitting/combining components, such as asymmetric couplers.

Although the present invention has been described in connection with a preferred embodiment, it should be understood that modifications, alterations, and additions can be made to the invention without departing from the scope of the invention as defined by the claims.

What is claimed is:

1. An optical coupler comprising:
a multi-mode forked grating structure configured to receive at least one optical vortex light beam, wherein the multi-mode forked grating structure comprises at least one forked region positioned amidst a plurality of grooves, wherein the forked region comprises a single groove forking into two grooves, wherein the single groove is noncontiguous with the two grooves, and wherein the plurality of grooves comprise a central bending region;
an optical waveguide; and
a tapered portion connecting the multi-mode forked grating structure and the optical waveguide.

2. The optical coupler of claim 1, wherein a first subset of the plurality of grooves comprise a first thickness, and a second subset of the plurality of grooves comprise a second thickness, wherein the first and second thicknesses are different.

3. The optical coupler of claim 1, wherein at least some of the plurality of grooves are segmented.

4. The optical coupler of claim 1, wherein each of the plurality of grooves comprises a first straight section and a second straight section, the first and second straight sections separated by a middle bending region, and wherein the first and second straight sections are parallel.

5. The optical coupler of claim 1, wherein the at least one forked region is positioned in the center of the multi-mode forked grating structure.

6. The optical coupler of claim 1, wherein the optical vortex light beam is received from an optic.

7. The optical coupler of claim 1, wherein the optical vortex light beam is received from an optical fiber.

8. The optical coupler of claim 1, wherein the coupler comprises at least two optical waveguides and at least two tapered portions.

9. An optical coupling system comprising:
an optical coupler comprising: (i) a multi-mode forked grating structure configured to receive at least one optical vortex light beam, wherein the multi-mode forked grating structure comprises at least one forked region positioned amidst a plurality of grooves, wherein the forked region comprises a single groove forking into two grooves, wherein the single groove is noncontiguous with the two grooves, and wherein the plurality of grooves comprise a central bending region; (ii) an optical waveguide; and (iii) a tapered portion connecting the multi-mode forked grating structure and the optical waveguide; and
a photonic integrated circuit configured to receive light from the optical coupler.

10. The optical coupling system of claim 9, wherein each of the plurality of grooves comprises a first straight section and a second straight section, the first and second straight sections separated by a middle bending region, and wherein the first and second straight sections are parallel.

11. The optical coupling system of claim 9, wherein the at least one forked region is positioned in the center of the multi-mode forked grating structure.

12. The optical coupling system of claim 9, wherein the optical vortex light beam is received from an optic.

13. The optical coupling system of claim 9, wherein the optical vortex light beam is received from an optical fiber.

14. The optical coupling system of claim 9, wherein the coupler comprises at least two optical waveguides and at least two tapered portions.

15. An optical coupler comprising:
a multi-mode forked grating structure configured to receive at least one optical vortex light beam, wherein the multi-mode forked grating structure comprises at least one forked region positioned amidst a plurality of grooves, wherein the forked region comprises a single groove forking into two grooves, wherein the single groove is noncontiguous with the two grooves, and wherein the plurality of grooves comprise a central bending region;
an optical waveguide; and
a tapered portion connecting the multi-mode forked grating structure and the optical waveguide;
wherein each of the plurality of grooves comprises a first straight section and a second straight section, the first and second straight sections separated by a middle bending region, and wherein the first and second straight sections are parallel;
wherein a first subset of the plurality of grooves comprise a first thickness, and a second subset of the plurality of grooves comprise a second thickness, wherein the first and second thicknesses are different.

16. The optical coupler of claim 15, wherein at least some of the plurality of grooves are segmented.

17. The optical coupler of claim 15, wherein the at least one forked region is positioned in the center of the multi-mode forked grating structure.

18. The optical coupler of claim 15, wherein the optical vortex light beam is received from an optic.

19. The optical coupler of claim 15, wherein the optical vortex light beam is received from an optical fiber.

20. The optical coupler of claim 15, wherein the coupler comprises at least two optical waveguides and at least two tapered portions.

* * * * *